(12) United States Patent
Baik et al.

(10) Patent No.: US 8,066,440 B2
(45) Date of Patent: Nov. 29, 2011

(54) CAMERA MODULE

(75) Inventors: Jae-Ho Baik, Busan (KR); Chul-Yeub Han, Anyang-si (KR); Myung-Jin Lee, Suwon-si (KR); Seong-Ho Kang, Sungnam-si (KR)

(73) Assignee: Samsung Electro-Mechanics Co., Ltd. (KP)

( * ) Notice: Subject to any disclaimer, the term of this patent is extended or adjusted under 35 U.S.C. 154(b) by 0 days.

(21) Appl. No.: 12/845,287

(22) Filed: Jul. 28, 2010

(65) Prior Publication Data

US 2011/0026915 A1 Feb. 3, 2011

(30) Foreign Application Priority Data

Jul. 28, 2009 (KR) .................. 10-2009-0068725

(51) Int. Cl.
*G03B 17/00* (2006.01)

(52) U.S. Cl. ...................................... 396/439; 396/529

(58) Field of Classification Search .................. 396/529, 396/439
See application file for complete search history.

(56) References Cited

U.S. PATENT DOCUMENTS

| 2002/0089176 A1* | 7/2002 | Iwasaki | 285/92 |
| 2006/0056060 A1* | 3/2006 | Ozaki et al. | 359/704 |
| 2008/0192124 A1* | 8/2008 | Nagasaki | 348/208.11 |
| 2008/0231974 A1* | 9/2008 | Jung | 359/824 |
| 2008/0309807 A1* | 12/2008 | Kinoshita et al. | 348/294 |

FOREIGN PATENT DOCUMENTS

| KR | 10-2008-0110495 | 12/2008 |
| KR | 10-0882277 | 2/2009 |

OTHER PUBLICATIONS

Korean Office Action, w/ partial English translation thereof, issued in Korean Patent Application No. KR 10-2009-0068725 dated Oct. 26, 2010.

* cited by examiner

*Primary Examiner* — Christopher Mahoney
*Assistant Examiner* — Linda B Smith
(74) *Attorney, Agent, or Firm* — McDermott Will & Emery LLP

(57) ABSTRACT

A camera module is disclosed. In accordance with an embodiment of the present invention, the camera module includes a lens barrel, which supports a lens and in which the lens allows a ray of light to be incident at an imaging part, a driver, which moves the lens barrel along an optical axis, a body, which houses the lens barrel, and a buffering part, which is interposed between the lens barrel and the body when the lens barrel collides with the body.

4 Claims, 5 Drawing Sheets

CAMERA MODULE

CROSS-REFERENCE TO RELATED APPLICATIONS

This application claims the benefit of Korean Patent Application No. 10-2009-0068725, filed with the Korean Intellectual Property Office on Jul. 28, 2009, the disclosure of which is incorporated herein by reference in its entirety.

BACKGROUND

1. Technical Field

The present invention is related to a camera module.

2. Description of the Related Art

Today's mobile terminals, such as mobile phones, PDAs and mobile PCs, not only transmits short-text messages or voice date but also take a photograph and transmit video data. In response to this trend, a camera module is typically installed in today's mobile terminals in order to enable photographing, video data transmission and video chatting.

Some camera modules have an auto-focusing function in order to automatically adjust the lens focus to the film or image sensor. In this case, the lens barrel of the camera module is formed in such a way that the lens barrel moves along the optical axis.

However, since the lens barrel of the camera module moves freely in a direction of the optical axis, the lens barrel may collide with another component, for example, the housing, when an external shock is applied to the camera module, and thus it is possible to damage the lens barrel.

SUMMARY

The present invention provides a camera module that can prevent the lens barrel from being damaged by colliding with another component when an external shock is applied.

An aspect of the present invention provides a camera module. The camera module in accordance with an embodiment of the present invention can include a lens barrel, which supports a lens and in which the lens allows a ray of light to be incident at an imaging part, a driver, which moves the lens barrel along an optical axis, a body, which houses the lens barrel, and a buffering part, which is interposed between the lens barrel and the body when the lens barrel collides with the body.

The buffering part is protruded on at least one of the lens barrel and the body.

The buffering part can be protruded on an end part on a side of a moving direction of the lens barrel in such a way that the buffering part faces the body.

The lens barrel can further include a guide part, which is protruded to guide a movement of the lens barrel, and the buffering part can be disposed on an end part of the guide part.

The buffering part can be formed on the body in such a way that the buffering part is protruded toward an end part on a side of a moving direction of the lens barrel.

The body can include a housing and a substrate, in which the housing covers the lens barrel, and the buffering part can be disposed on at least one of the housing and the substrate.

The housing can include a partition wall, which covers the lens barrel on the side of the moving direction of the lens barrel, and the buffering part can be disposed on the partition wall in such a way that the buffering part faces the lens barrel.

The buffering part can be made of an elastic body.

The buffering part can be made of a material including at least one of rubber, silicon and silicon rubber.

The buffering part can be formed by being coated or adhered to the lens barrel or the body.

The buffering part can include a plate-shaped buffering pad, which is interposed between the lens barrel and the body.

The body can include a housing, which covers the lens barrel, and the buffering pad can be adhered to a surface of the housing, in which the surface faces the lens barrel.

The buffering pad can be made of an elastic body.

The buffering pad can be made of a material including at least one of rubber, silicon and silicon rubber.

Additional aspects and advantages of the present invention will be set forth in part in the description which follows, and in part will be obvious from the description, or may be learned by practice of the invention.

DETAILED DESCRIPTION

The features and advantages of this invention will become apparent through the below drawings and description.

Figure 1:
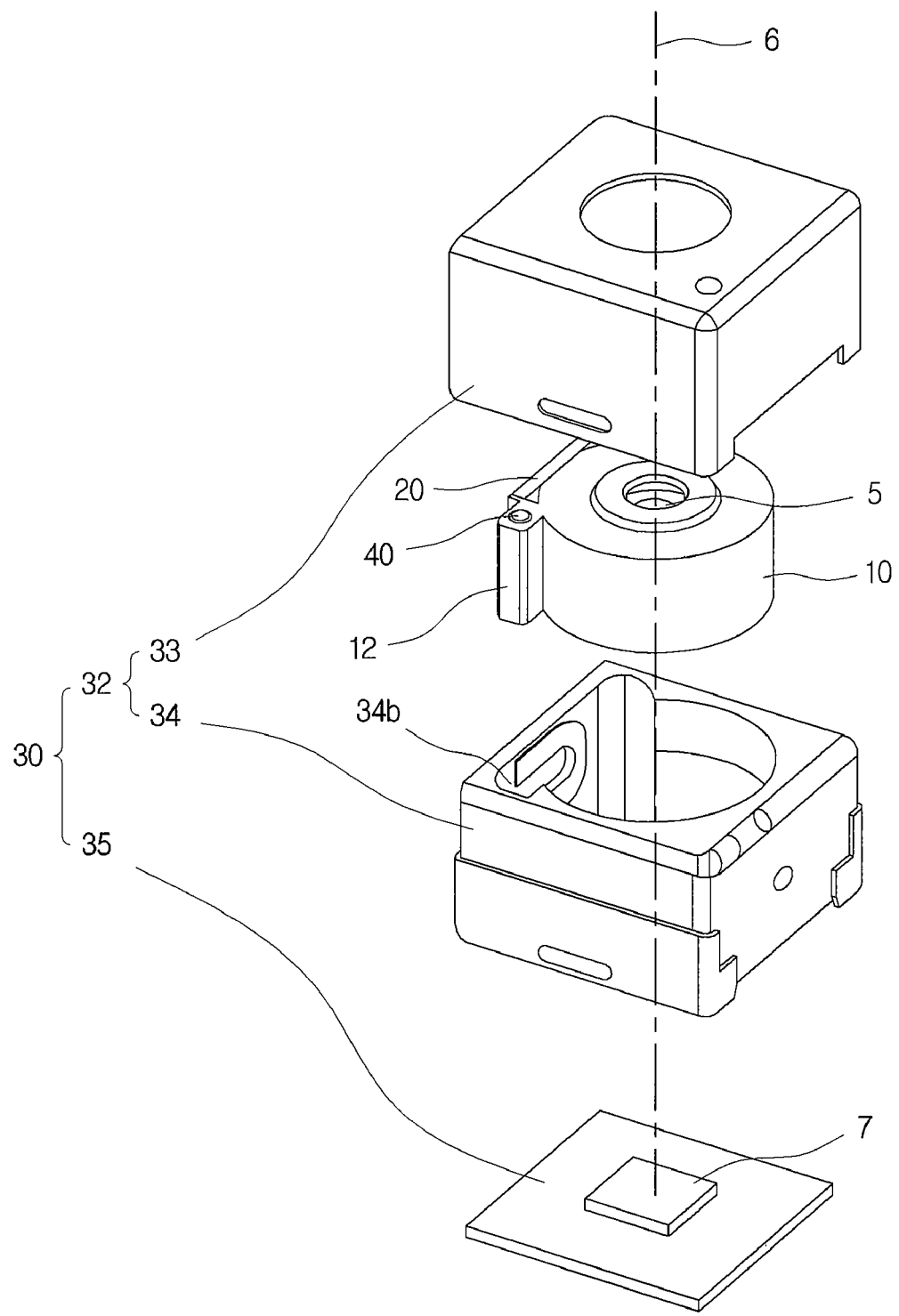
FIG. 1 is an exploded perspective view of a camera module in accordance with an embodiment of the present invention.
Figure 2:
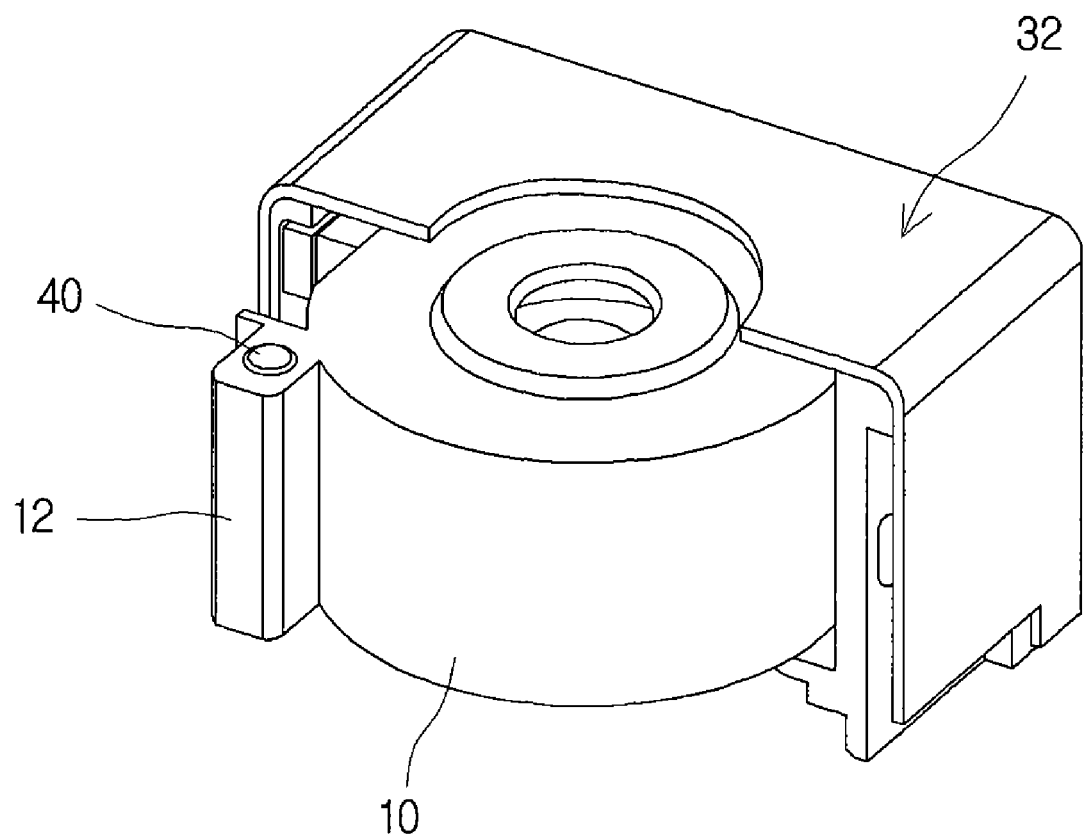
FIG. 2 is a partial sectional view of a camera module in accordance with an embodiment of the present invention.

FIG. 1 is an exploded perspective view of a camera module in accordance with an embodiment of the present invention, and FIG. 2 is a partial sectional view of a camera module in accordance with an embodiment of the present invention.

The camera module in accordance with an embodiment of the present invention includes a lens barrel 10, a driver 20, a body 30 and a buffering part 40.

The lens barrel 10 is a part to which a lens 5, which allows a ray of light to be incident at an imaging part 7, such as an image sensor or a film, is supported and is formed in such a way that the lens barrel 10 can move along an optical axis 6 in order to adjust the lens focus to the imaging part 7.

In the present embodiment, the lens barrel 10 is shaped like a pole, and the lens 5 is disposed along the center line of the pole-shaped lens barrel 10. Also, the lens barrel 10 is formed in such a way that the lens barrel 10 can move in a lengthwise direction of the pole-shaped lens barrel 10, and thus it is possible to adjust the lens focus.

The driver 20 moves the lens barrel 10 along the optical axis 6 in order to adjust the lens focus and includes an actuator for transporting the lens barrel 10.

In the present embodiment, a piezoelectric vibrator that transports the lens barrel 10 by pushing the lens barrel 10 from a side surface of the lens barrel 10 is used as the actuator.

The body 30 forms a space for housing the lens barrel 10. The imaging part 7, such as an image sensor or a film, on which an image is formed by a ray of light incident through the lens 5 of the lens barrel 10, is disposed inside the body 30. With this arrangement, the lens barrel 10 inside the body 30 can move along the optical axis 6 to adjust the lens focus to the imaging part 7.

Specifically, the body 30 of the present embodiment is constituted by a housing 32, which covers the constituting parts of the camera module, and a substrate 35, which covers the housing 32. Here, the housing 32 is separated into an upper housing 33 and a lower housing 34 in order to provide easier installation of the lens barrel 10. Then, the image sensor 7 disposed on the optical axis 6 is mounted on the substrate 35.

The buffering part 40 mitigates external shocks when the lens barrel 10 collides with the body 30, and the buffering part of the present embodiment is protruded on at least one of the lens barrel 10 and the body 30, and thus the buffering part 40 can be interposed between the lens barrel 10 and the body 30. Accordingly, the buffering part 40 prevents the lens barrel 10 and the body 30 from being damaged when the lens barrel 10 collides with the body 30 due to external shocks.

Figure 3:
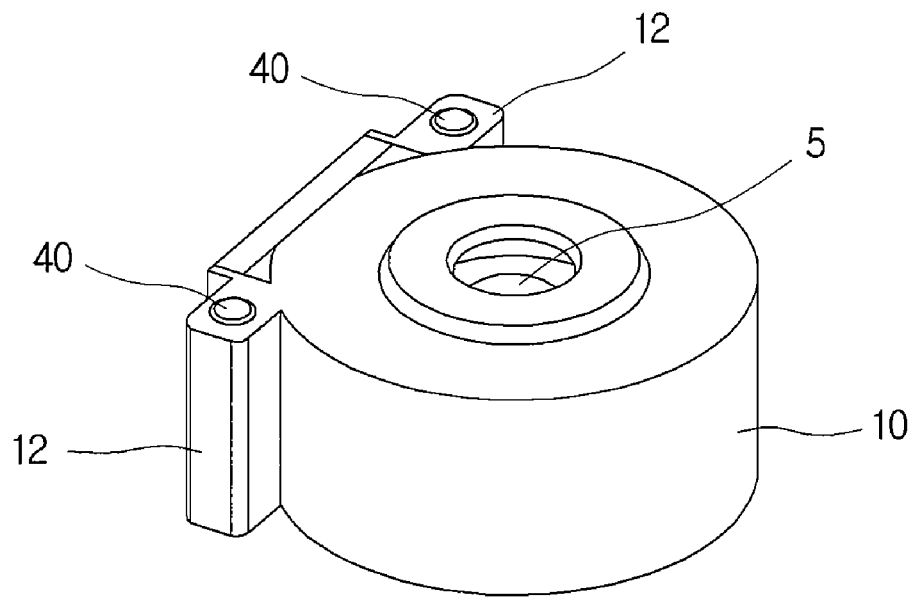
FIG. 3 is a perspective view illustrating a buffering part installed in a lens barrel of a camera module in accordance with an embodiment of the present invention.
Figure 3:
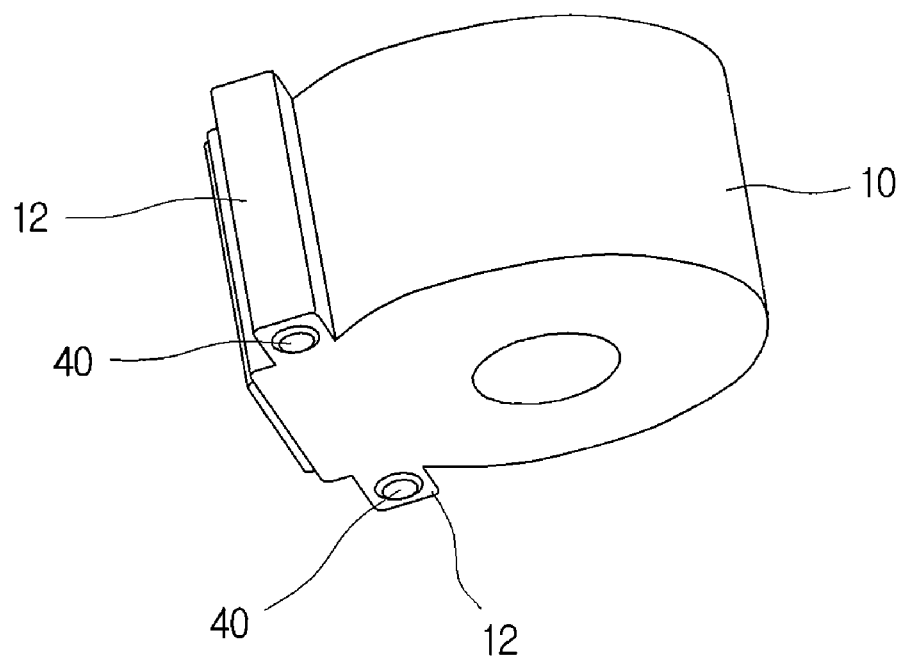

FIG. 3 is a perspective view illustrating the buffering part 40 installed in the lens barrel 10 of a camera module in accordance with an embodiment of the present invention.

The buffering part 40 of the present embodiment is protruded on an end part of a side of a moving direction of the pole-shaped lens barrel 10 in such a way that the buffering part 40 faces the body 30, and thus the buffering part 40 can perform a function of buffering between the lens barrel 10 and the body 30 by being first contacted by the body 30 when the lens barrel 10 collides with the body 30. That is, the buffering part 40 can be protruded on an end part of the pole-shaped lens barrel 10, which moves along the optical axis 6, so as to face the body 30.

Specifically, as illustrated in FIG. 3, the lens barrel 10 of the present embodiment is formed in such a way that the lens barrel 10 can move in a lengthwise direction of the pole-shaped lens barrel 10, as described above. Accordingly, the buffering part 40 can be formed on an upper surface or a lower surface of the lens barrel 10 because the upper surface and the lower surface of the pole-shaped lens barrel 10 are likely to collide with the body 30.

Particularly, the buffering part 40 can be disposed on an end part of a guide part 12, which guides the lens barrel 10. The lens barrel 10 of the present embodiment can include the guide part 12 that is protruded to guide a transfer path of the lens barrel 10 when the lens barrel 10 moves. Since the guide part 12 moves along the optical axis 6 by being inserted in a guide groove 34b formed in the housing 32, the lens barrel 10 can also move in a direction of the optical axis 6.

Since the guide part 12 is an additional part of the lens barrel 10, the internal components, for example, the lens 5, of the lens barrel 10 are less likely to be affected by external shocks even though the guide part 12 collides with another part, for example, the body 30, compared to other parts of the lens barrel 10. Accordingly, the buffering part 40 can be formed on an end part of the guide part 12, which faces the body 30 when the lens barrel 10 moves, and thus a damage caused by the collision can be minimized.

Meanwhile, the buffering part 40 can be formed on the body 30.

Figure 4:
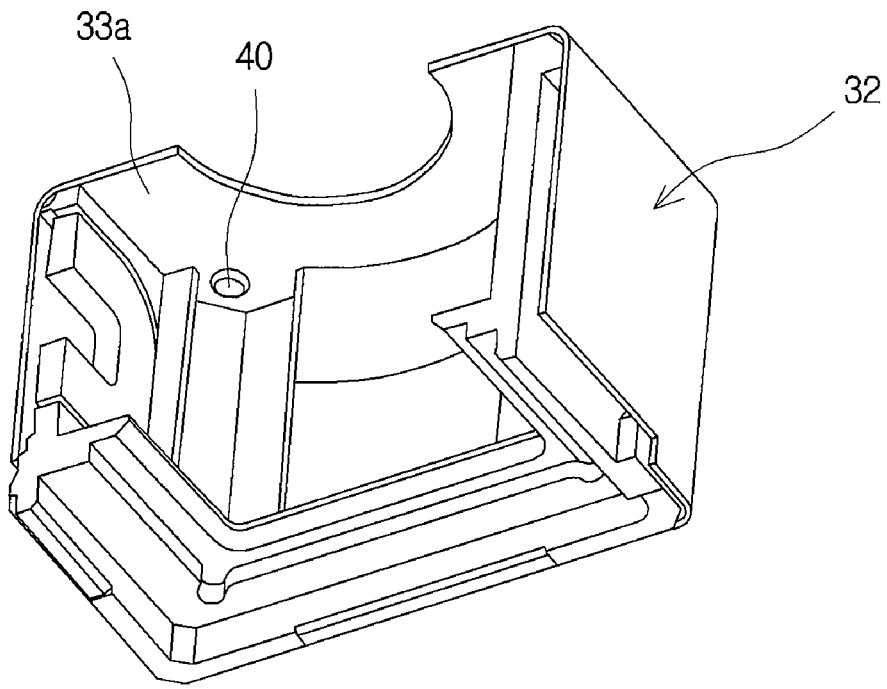
FIG. 4 is a perspective view illustrating a buffering part installed in a body of a camera module in accordance with an embodiment of the present invention.
Figure 4:
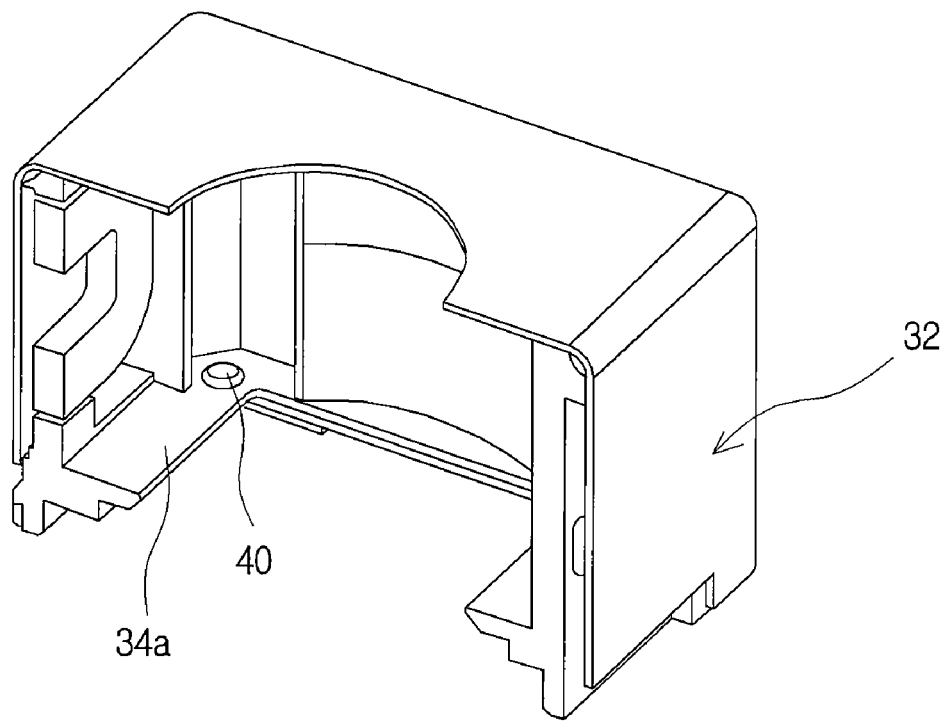

FIG. 4 is a perspective view illustrating the buffering part 40 installed in the body 30 of a camera module in accordance with an embodiment of the present invention.

The buffering part 40 of the present embodiment can be protruded on a part of the body 30 that faces an end part of the lens barrel 10. That is, the buffering part 40 can be protruded on a part of the body 30 that is approached by the moving lens barrel 10 along the optical axis 6, and thus the buffering part 40 can perform a function of buffering between the lens barrel 10 and the body 30 by being first contacted by the moving lens barrel 10 when the lens barrel 10 collides with the body 30.

Specifically, as illustrated in FIG. 4, the buffering part 40 of the present embodiment can be disposed on partition walls 33a and 34a of the housing 32, which covers the lens barrel 10, to face the lens barrel 10. More specifically, the buffering part 40 can be formed in such a way that the buffering part 40 facing the lens barrel 10 is protruded from the partition walls 33a and 34a, with which the lens barrel 10 moving along the optical axis 6 collides, of the housing 32. Accordingly, the buffering part 40 can perform a function of buffering between the lens barrel 10 and the body 30 by being first contacted by the lens barrel 10 when the lens barrel 10 collides with the body 30. Moreover, the buffering part 40 can be disposed on the substrate 35, which covers the lens barrel 10, such that the buffering part 40 faces the lens barrel 10.

Here, the buffering part 40 is made of an elastic body, for example, rubber, silicon and silicon rubber, and can effectively absorb an external shock caused by a collision. Also, the buffering part 40 is made of a non-sticky material, and thus it is possible to prevent the buffering part 40 from being stuck to the lens barrel 10 or the body 30 while the lens barrel 10 and the body 30 are separated by using the driver 20 after a collision.

The buffering part 40 can be readily formed by coating or adhering an adhesive type of buffering material to the lens barrel 10 or the body 30.

Next, a camera module in accordance with another embodiment of the present invention will be described hereinafter.

Figure 5:
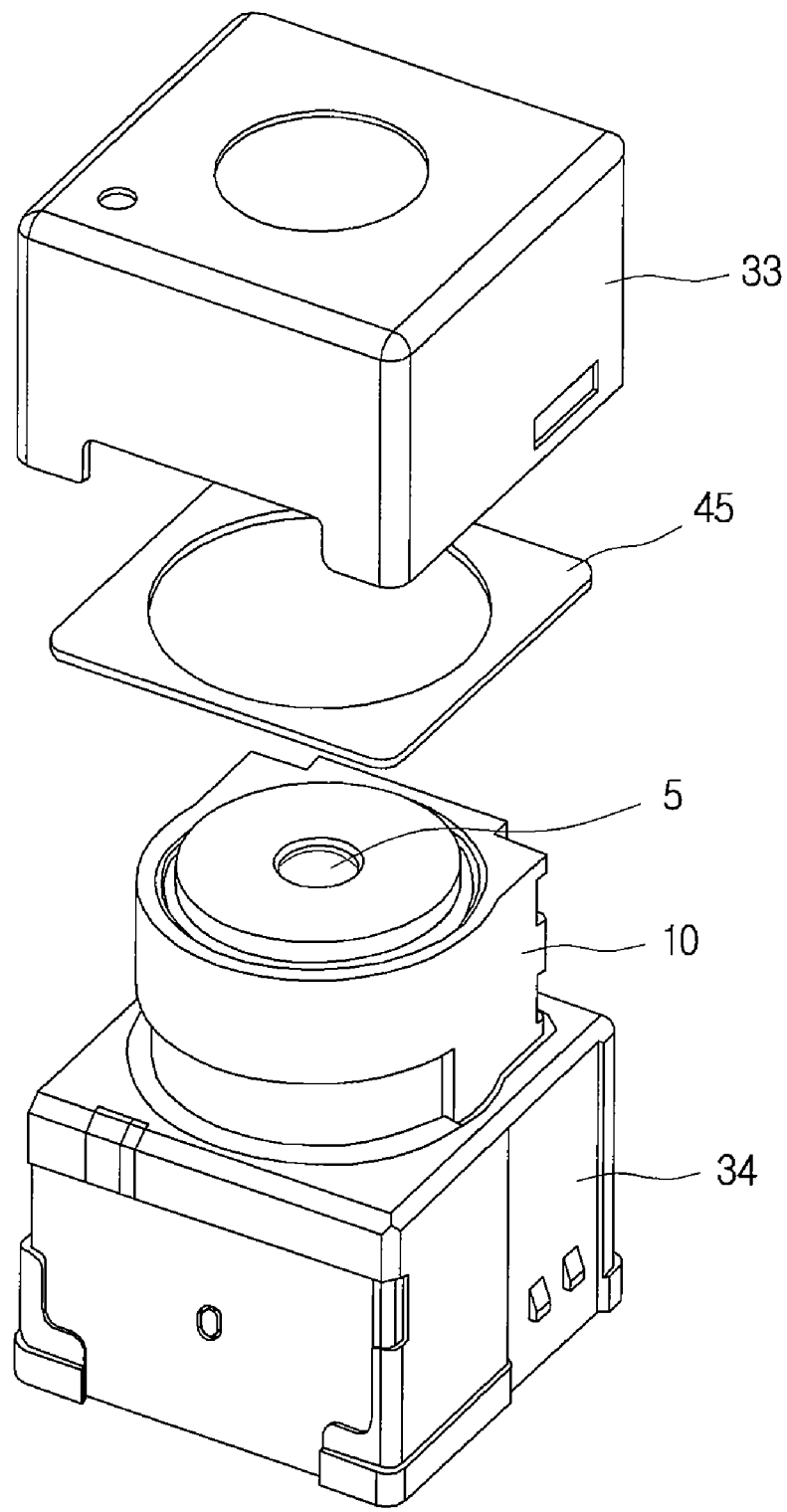
FIG. 5 is an exploded perspective view of a camera module in accordance with another embodiment of the present invention.

FIG. 5 is an exploded perspective view of a camera module in accordance with another embodiment of the present invention.

As illustrated in FIG. 5, the camera module of the present embodiment is different from the previously described embodiment of the present invention in that a plate-shaped buffering pad 45, which is interposed between the lens barrel 10 and the body 30, is used as the buffering part 40.

Specifically, the buffering pad 45 of the present embodiment can be adhered to a surface of the upper housing 33 that faces the lens barrel 10. With this arrangement, a buffering pad 45 having a uniform height can be readily formed on upper housing 33. Accordingly, the lens barrel 10 can be evenly supported by the buffering pad 45 when the lens barrel 10 moves and collides with the upper housing 33.

Here, the buffering pad 45 can be made of an elastic body, for example, rubber, silicon and silicon rubber, and effectively absorb external shocks due to the collision.

According to an embodiment of the present invention, it is possible to prevent a camera module from being damaged by mitigating an impact when the lens barrel collides with the body.

While the spirit of the invention has been described in detail with reference to a certain embodiment, the embodiment is for illustrative purposes only and shall not limit the invention. It is to be appreciated that those skilled in the art can change or modify the embodiment without departing from the scope and spirit of the invention.

As such, many embodiments other than that set forth above can be found in the appended claims.

What is claimed is:
1. A camera module comprising:
a lens barrel supporting a lens, the lens allowing a ray of light to be incident at an imaging part;
a driver configured to move the lens barrel along an optical axis;
a body housing the lens barrel; and a buffering part interposed between the lens barrel and the body when the lens barrel collides with the body, wherein the lens barrel further comprises a guide part protruded to guide a movement of the lens barrel, and the buffering part is disposed on an end part of the guide part.

2. The camera module of claim 1, wherein the buffering part is made of an elastic body.

3. The camera module of claim 1, wherein the buffering part is formed by being coated or adhered to the lens barrel or the body.

4. The camera module of claim 2, wherein the buffering part is made of a material comprising at least one of rubber, silicon and silicon rubber.

* * * * *